United States Patent
Wu (10) Patent No.: US 7,572,071 B1
(45) Date of Patent: Aug. 11, 2009

(54) CABLE ASSEMBLY UTILIZED FOR DIFFERENT KINDS OF SIGNAL TRANSMISSION

(75) Inventor: Jerry Wu, Irvine, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/221,294

(22) Filed: Aug. 1, 2008

(51) Int. Cl.
  *G02B 6/36* (2006.01)
  *G02B 6/00* (2006.01)
  *G02B 6/44* (2006.01)

(52) U.S. Cl. .......................... 385/94; 385/88; 385/101; 385/139

(58) Field of Classification Search ............. 385/88–94, 385/100, 101, 139
See application file for complete search history.

(56) References Cited

U.S. PATENT DOCUMENTS

| | | | |
|---|---|---|---|
| 6,039,611 A * | 3/2000 | Yang | 439/701 |
| 6,338,652 B1 * | 1/2002 | Ko | 439/579 |
| 7,021,971 B2 | 4/2006 | Chou et al. | |
| 7,104,848 B1 | 9/2006 | Chou et al. | |
| 7,380,991 B2 | 6/2008 | Schempp | |

\* cited by examiner

*Primary Examiner*—Kevin S Wood
(74) *Attorney, Agent, or Firm*—Wei Te Chung (57) ABSTRACT

A cable assembly (1) includes an insulative housing (2) having a base portion (21) and a tongue portion (22), said tongue portion (22) defining a number of cavities (222) recessed inwardly from one of an upper or a bottom surfaces of the tongue portion; a number of lenses (5) retained in the cavities (222) and connected to corresponding optical fiber (103); and a plurality of contacts (3, 4) mounted to the insulated housing (2), each of the contacts having a mating portion (32, 42) disposed about the other surface of the tongue portion (22) and a tail portion (36, 46) rearward extending beyond the base portion (21) for electrically connecting with a corresponding wire.

20 Claims, 9 Drawing Sheets

CABLE ASSEMBLY UTILIZED FOR DIFFERENT KINDS OF SIGNAL TRANSMISSION

CROSS-REFERENCE TO RELATED APPLICATIONS

This application is related to U.S. patent application Ser. No. 11/818,100, filed on Jun. 13, 2007 and entitled "EXTENSION TO UNIVERSAL SERIAL BUS CONNECTOR WITH IMPROVED CONTACT ARRANGEMENT", and U.S. patent application Ser. No. 11/982,660, filed on Nov. 2, 2007 and entitled "EXTENSION TO ELECTRICAL CONNECTOR WITH IMPROVED CONTACT ARRANGEMENT AND METHOD OF ASSEMBLING THE SAME", both of which have the same assignee as the present invention.

BACKGROUND OF THE INVENTION

1. Field of the Invention

The present invention relates to a cable assembly, more particularly to a cable assembly which is capable of transmitting an electrical signal and an optical signal.

2. Description of Related Art

Recently, personal computers (PC) are used of a variety of techniques for providing input and output. Universal Serial Bus (USB) is a serial bus standard to the PC architecture with a focus on computer telephony interface, consumer and productivity applications. The design of USB is standardized by the USB Implementers Forum (USB-IF), an industry standard body incorporating leading companies from the computer and electronic industries. USB can connect peripherals such as mouse devices, keyboards, PDAs, gamepads and joysticks, scanners, digital cameras, printers, external storage, networking components, etc. For many devices such as scanners and digital cameras, USB has become the standard connection method.

USB supports three data rates: 1) A Low Speed rate of up to 1.5 Mbit/s (187.5 KB/s) that is mostly used for Human Interface Devices (HID) such as keyboards, mice, and joysticks; 2) A Full Speed rate of up to 12 Mbit/s (1.5 MB/s). Full Speed was the fastest rate before the USB 2.0 specification and many devices fall back to Full Speed. Full Speed devices divide the USB bandwidth between them in a first-come first-served basis and it is not uncommon to run out of bandwidth with several isochronous devices. All USB Hubs support Full Speed; 3) A Hi-Speed rate of up to 480 Mbit/s (60 MB/s). Though Hi-Speed devices are advertised as "up to 480 Mbit/s", not all USB 2.0 devices are Hi-Speed. Hi-Speed devices typically only operate at half of the full theoretical (60 MB/s) data throughput rate. Most Hi-Speed USB devices typically operate at much slower speeds, often about 3 MB/s overall, sometimes up to 10-20 MB/s. A data transmission rate at 20 MB/s is sufficient for some but not all applications. However, under a circumstance transmitting an audio or video file, which is always up to hundreds MB, even to 1 or 2 GB, currently transmission rate of USB is not sufficient. As a consequence, faster serial-bus interfaces are being introduced to address different requirements. PCI Express, at 2.5 GB/s, and SATA, at 1.5 GB/s and 3.0 GB/s, are two examples of High-Speed serial bus interfaces.

From an electrical standpoint, the higher data transfer rates of the non-USB protocols discussed above are highly desirable for certain applications. However, these non-USB protocols are not used as broadly as USB protocols. Many portable devices are equipped with USB connectors other than these non-USB connectors. One important reason is that these non-USB connectors contain a greater number of signal pins than an existing USB connector and are physically larger as well. For example, while the PCI Express is useful for its higher possible data rates, a 26-pin connectors and wider card-like form factor limit the use of Express Cards. For another example, SATA uses two connectors, one 7-pin connector for signals and another 15-pin connector for power. Due to its clumsiness, SATA is more useful for internal storage expansion than for external peripherals.

The existing USB connectors have a small size but low transmission rate, while other non-USB connectors (PCI Express, SATA, et al) have a high transmission rate but large size. Neither of them is desirable to implement modern high-speed, miniaturized electronic devices and peripherals. To provide a kind of connector with a small size and a high transmission rate for portability and high data transmitting efficiency is much desirable.

In recent years, more and more electronic devices are adopted for optical transmitter. It may be good idea to design a connector which is capable of transmitting an electrical signal and an optical signal. Someone has begun to conceive such kind of connector which is compatible of electrical and optical signals transmitting. The connector includes metallic contacts assembled to an insulated housing and several optical lenses bundled together and mounted to the housing too. A kind of hybrid cable includes wires and fiber are respectively attached to the metallic contacts and the optical lenses.

However, the aforementioned connector is troublesome in assembling, especially mounting the lenses to the insulated housing.

BRIEF SUMMARY OF THE INVENTION

Accordingly, an object of the present invention is to provide an easily manufactured cable assembly which is capable of transmitting an electrical signal and an optical signal.

In order to achieve the above-mentioned object, a cable assembly in accordance with present invention comprises an insulative housing having a base portion and a tongue portion, said tongue portion defining a number of cavities recessed inwardly from one of an upper or a bottom surfaces of the tongue portion; a number of lenses retained in the cavities and connected to corresponding optical fiber; and a plurality of contacts mounted to the insulated housing, each of the contacts having a mating portion disposed about the other surface of the tongue portion and a tail portion rearward extending beyond the base portion for electrically connecting with a corresponding wire.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Reference will be made to the drawing figures to describe the present invention in detail, wherein depicted elements are not necessarily shown to scale and wherein like or similar elements are designated by same or similar reference numeral through the several views and same or similar terminology.

Figure 1:
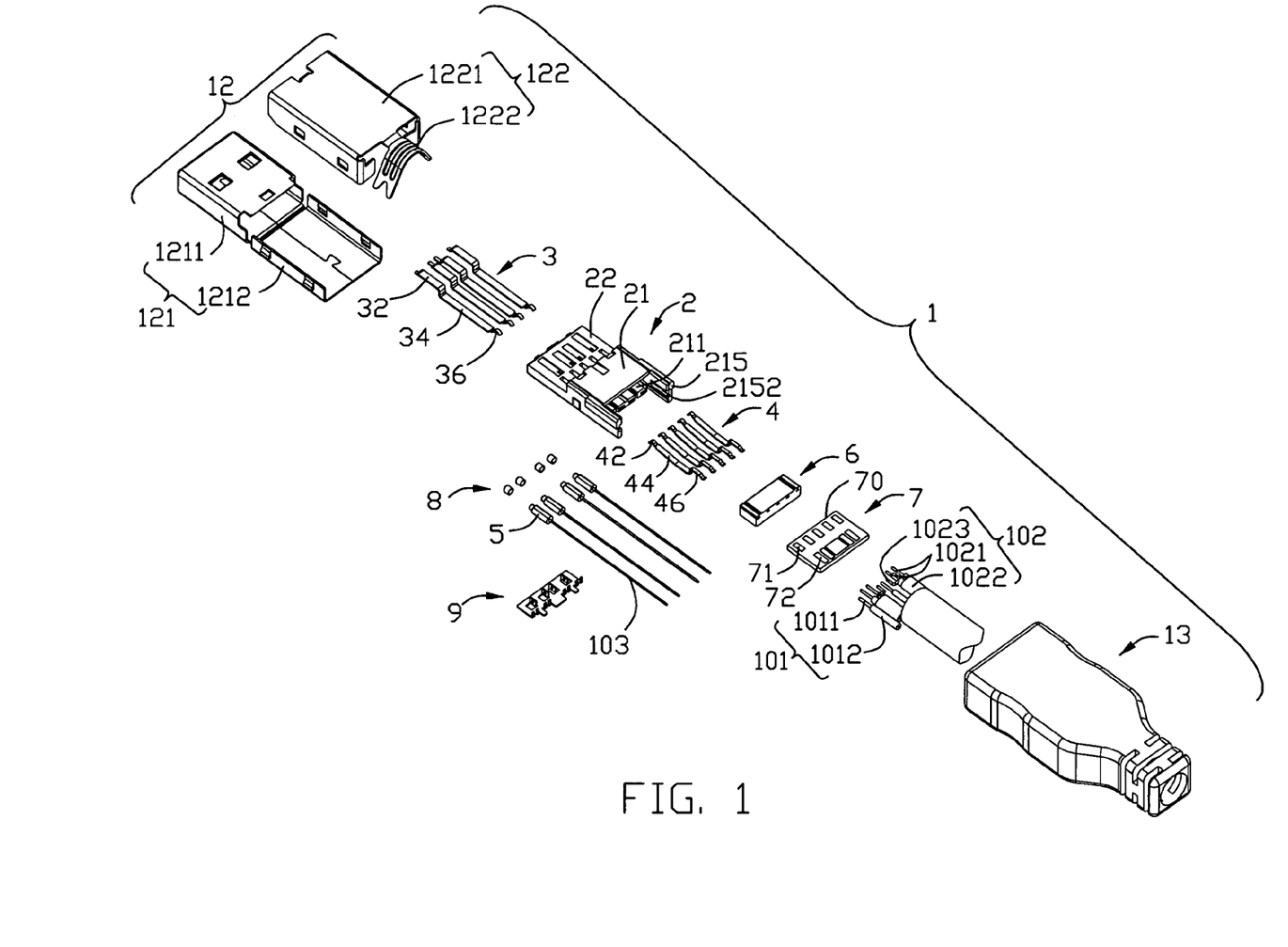
FIG. 1 is an exploded, perspective view of a cable assembly in accordance with the first embodiment of the present invention.
Figure 2:
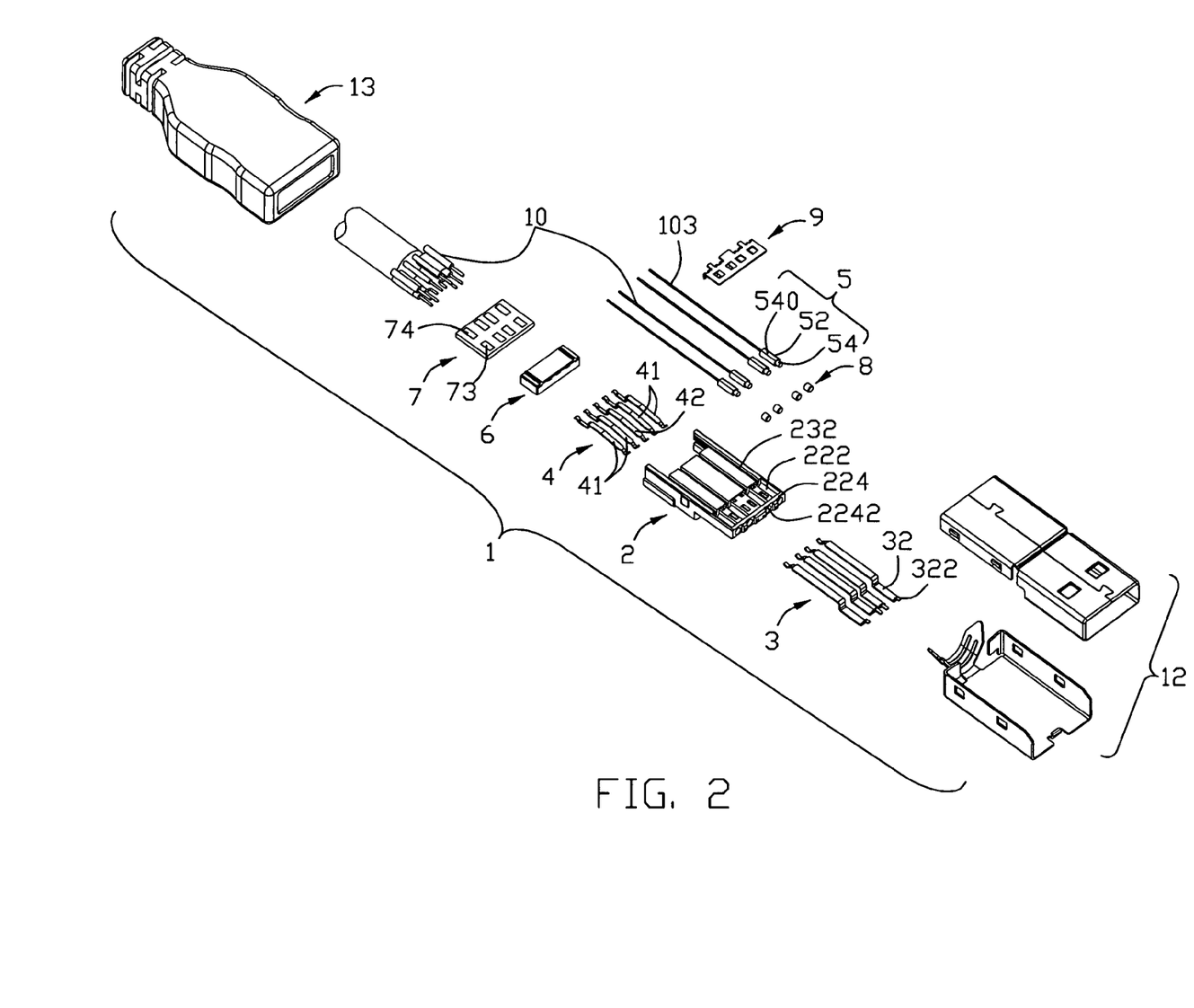
FIG. 2 is a view similar to FIG. 1, but viewed from a different aspect.
Figure 3:
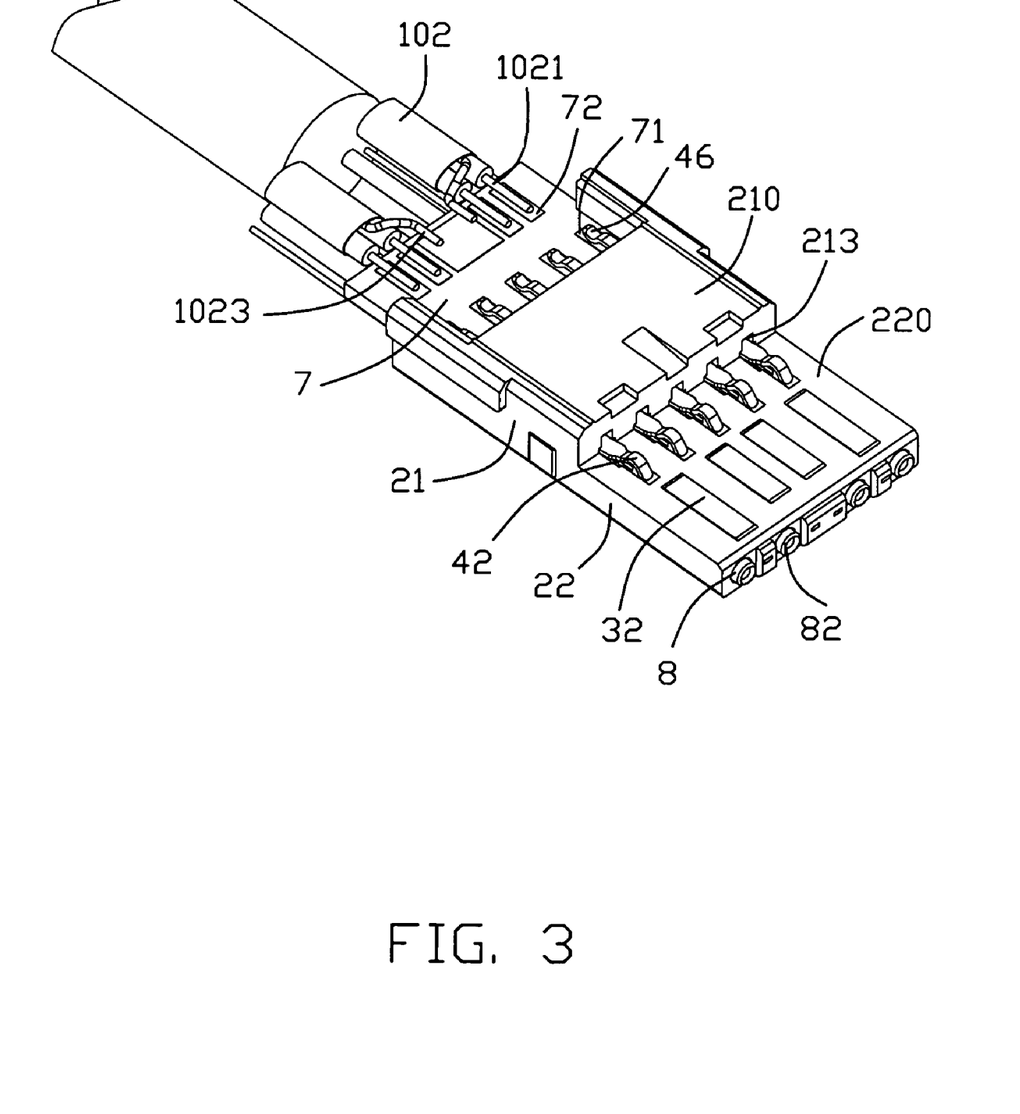
FIG. 3 is a partially assembled view of the cable assembly.
Figure 4:
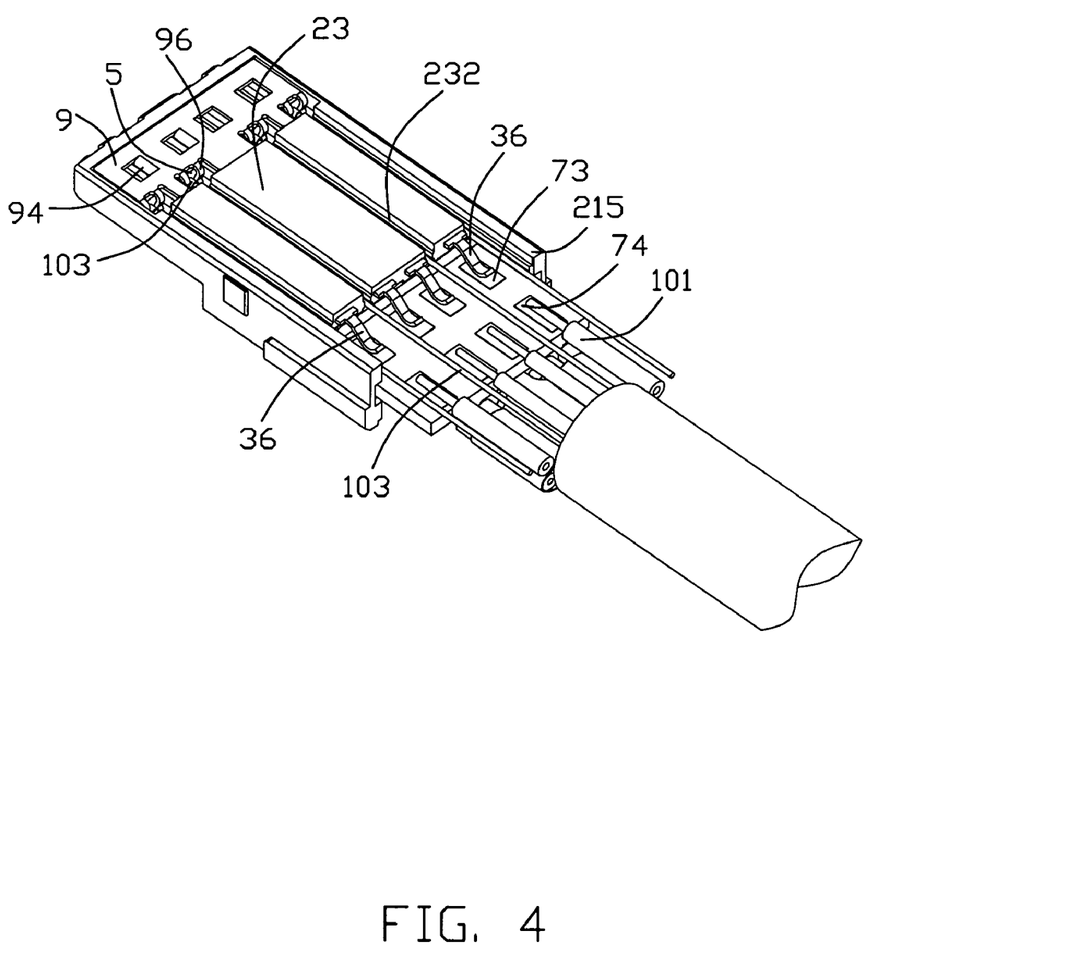
FIG. 4 is a view similar to FIG. 3, but viewed from a different aspect.
Figure 5:
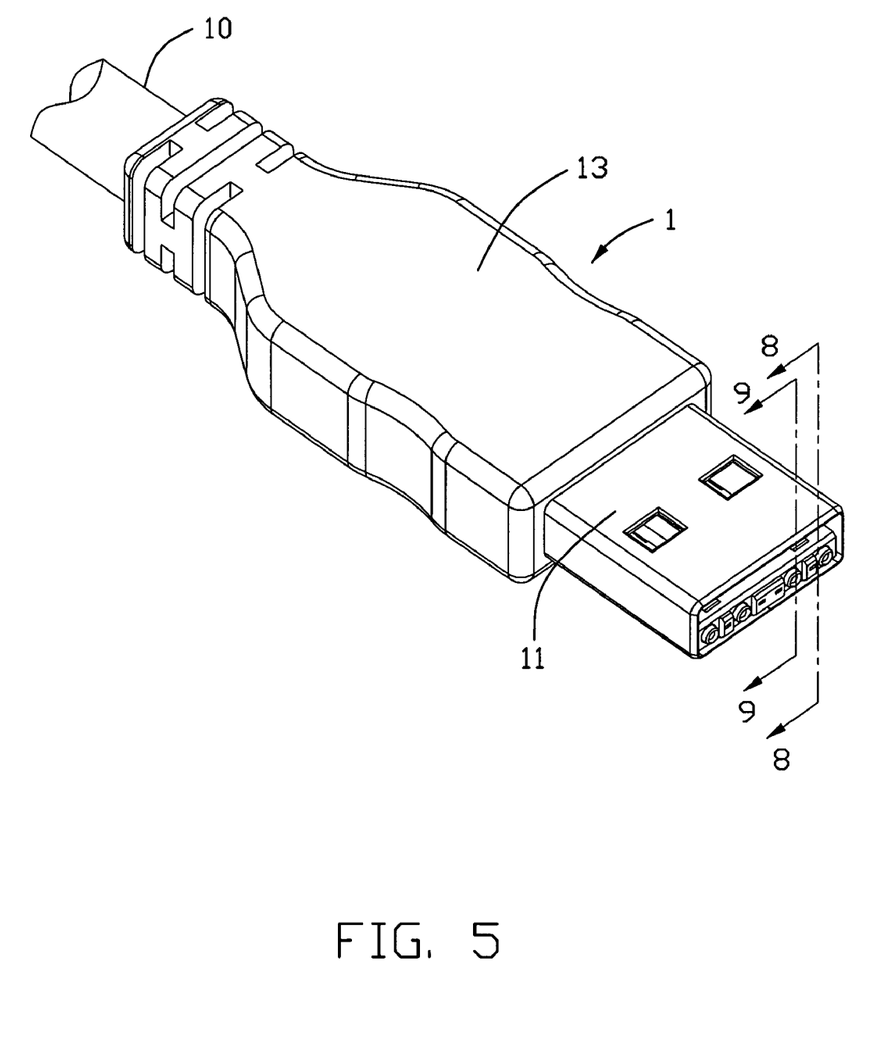
FIG. 5 is an assembled, perspective view of the cable assembly.

Referring to FIGS. 1, 2, 5 and in connection with FIGS. 3, 4, 6-9, a cable assembly 1 according to a preferred embodiment of the present invention includes a cable 10, a connector 11, a metal shell 12 and a cover 13. Detail description of these elements and their relationship and other elements formed thereon will be detailed below.

The connector 11 comprises an insulative housing 2 which has an insulative base portion 21 and an insulative tongue portion 22 extending forwardly from a front edge of the insulative base portion 21, a set of first contacts 3 and a set of second contacts 4 supported in the insulative housing 2, a number of optical lenses 5 mounted to the tongue portion 22.

Figure 6:
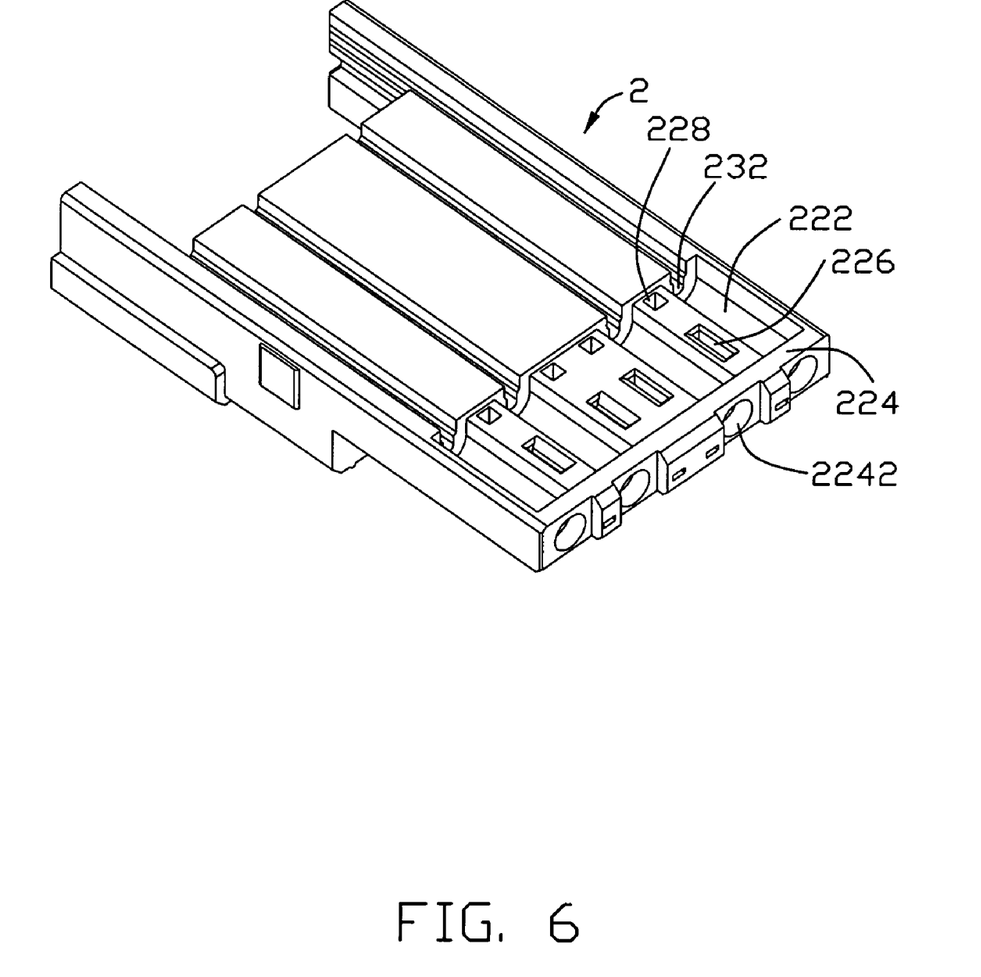
FIG. 6 is an enlarged view of a insulated housing.

The base portion 21 and the tongue portion 22 of the insulative housing 2 are integrally injecting molded as a unitary one piece. The base portion 21 has a top surface 210 which is higher than a top surface 220 of the tongue portion 22 along a vertical direction. A hollow portion 211 is recessed forwardly from a back surface of the base portion 21, and a number of contact passages 213 are arranged in a row along a transversal direction and recessed from a front surface of an upper segment of the base portion 21 and further in communication to the hallow portion 211. A pair of arm portions 215 extend rearward from lateral sides of the back face of the base portion 21. A groove 2152 is defined in an inner side of each arm portion 215. A rectangular-shaped platform portion 23 is attached to bottom surfaces of the base portion 21 and a rear segment of the tongue portion 22. A number of narrow passages 232 are recessed upward from a bottom surface of the platform portion 23 and arranged to be parallel to one another along the transversal direction, and a number of cavities 222 are located in a bottom side of a front segment of the tongue portion 22 and respectively communicated with the passages 232. Each cavity 222 is deeper and broader than the corresponding passage 232. A blocking board 224 is disposed in front of the cavities 222 and integrated with an upper and lateral sides of the tongue portion 22. A number of front outlets 2242 are defined in the blocking board 224 and communicated with the cavities 222.

Each of the first contacts 3 includes a planar retention portion 34, a planar mating portion 32 and a curved tail portion 36 formed at an end of the retention portion 34. The retention portion 34 and the mating portion 32 are parallel to one another and interconnected together via a vertical transition portion (not numbered). A tip part 322 is formed at a front end of the mating portion 32 and disposed lower than the mating portion 32 along the vertical direction. The set of first contacts 3 are insert-molded with the insulated housing 2, with the retention portions 34 embedded in the platform portion 23, the mating portions 32 thereof disposed on the top surface of a front segment of the tongue portion 22 and the tail portions 36 extending beyond a back surface of the platform portion 23. The tip portions 322 of the first contacts 3 are also inserted in the tongue portion 22.

The second set of second contacts 4 include two pairs of differential contacts 41 and a grounding contact 42 located between the two pairs of differential contacts 41 for preventing cross-talk. The two pairs of differential contacts 41 are used for transferring high-speed signals. Each second contact 4 comprises a curved mating portion 42, an elongated retention portion 44 stretched along a front-to-back direction and a tail portion 46 extending rearwardly from the retention portion 44. Rear segments of the retention portions 44 are integrated with an insulator 6. The second contacts 4 are assembled to the insulated housing 2, with the mating portions 42 extending through the contact passages 213 and disposed above a back segment of the top surface 220, the front segments of the retention portions 44 accommodated in the contact passages 213, the insulator 6 received in the hollow portion 211 and the tail portions 46 disposed outside of the base portion 21.

Each lens 5 includes a body portion 52 connected to corresponding optical fiber 103 and thinner header portion 54 extending forward from a front surface of the body portion 52. A number of tube-shaped protective members 8 made of metallic materials or other rigid materials are respectively mounted into the front outlets 2242 of the blocking board 224. A front segment of each protective member 8 extends beyond a front surface of the blocking board 224. Each protective member 8 further has a tapered front end 82 for blind-mating function. The lenses 5 are mounted to the insulated housing 2, with the body portions 52 thereof respectively arranged in the cavities 222 located in the tongue portion 22, the header portions 54 received in the protective members 8.

Figure 7:
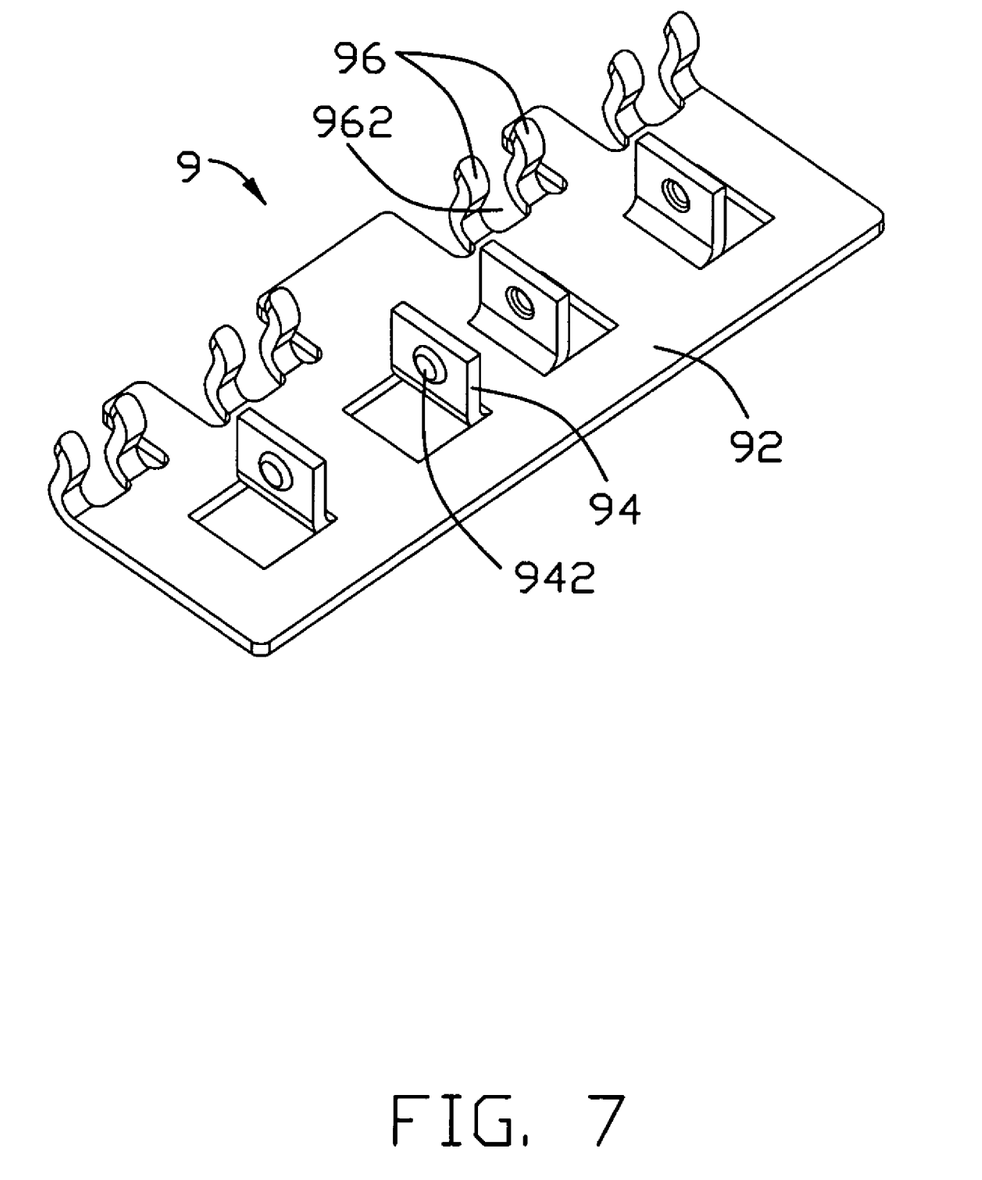
FIG. 7 is an enlarged view of a retaining member.
Figure 8:
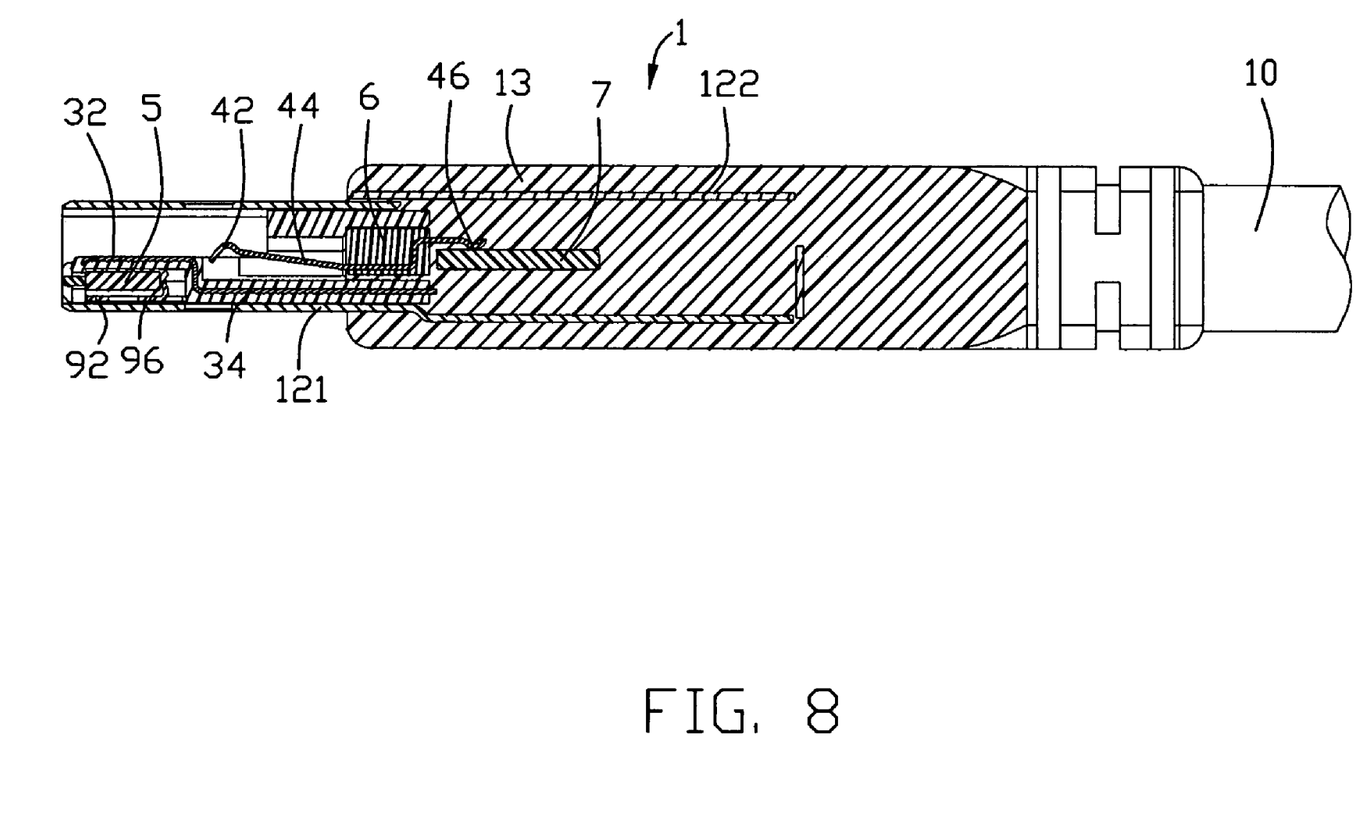
FIG. 8 is a cross-section view of FIG. 5 taken along line 8-8.
Figure 9:
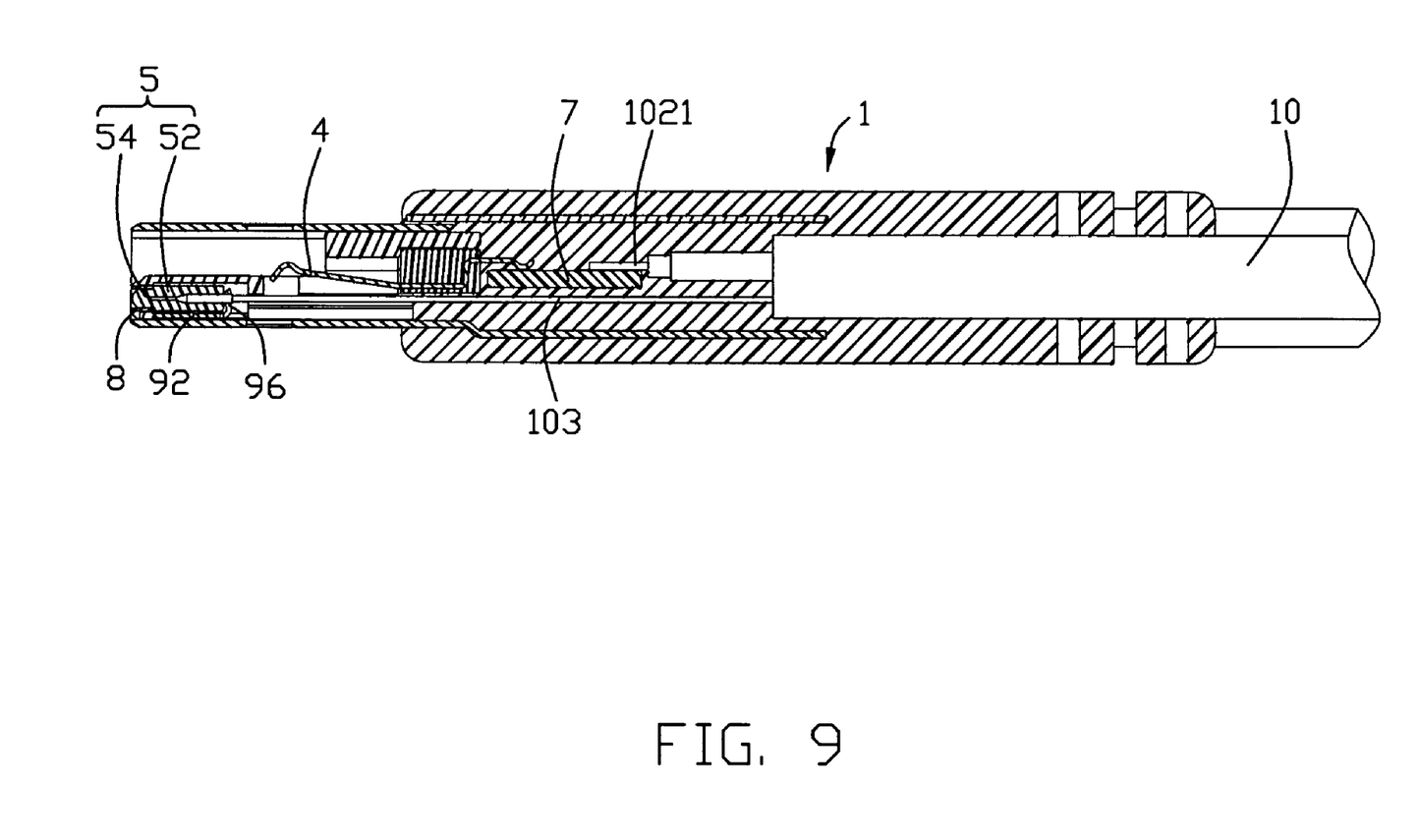
FIG. 9 is a cross-section view of FIG. 5 taken along line 9-9.

A retaining member 9 is utilized for securing the lenses 5 and the insulated housing 2 together. The retaining member 9 includes a flat main portion 92, a number of upright retention portions 94 unitarily formed with the main portion 92 and arranged in a row along the transversal direction and disposed in the front segment of the main portion 92. A protruding member 942 is formed on a lateral side of each retention portion 94. A plurality of curved spring fingers 96 are formed at a rear edge of the main portion 92 and extend beyond an upper surface of the main portion 92. The spring members 96 are divided into four groups and each group has a juxtaposed pair with a passage 962 therebetween. The passage 962 between the two adjacent spring members 96 is offset to the retention portion 94 arranged in front of it along a longitudinal direction.

The retaining member 9 is mounted to the tongue portion 2 to fix and shield the lenses 5, with the retention portions 94 inserted into first holes 226 in the tongue portion 22, the spring members 96 inserted into second holes 228 in the tongue portion 22, rear edges of the lenses 5 relying against front surfaces of the spring members 96, optical fiber 103 rearward extending via passages 962 of the spring members 96. The body portion 52 of each lens 5 has a flat bottom surface 52 riding again the main portion 92, and such configuration may prevent rotation of the lenses 5.

The connector 11 is compatible to existing standard USB receptacle. The geometric profile of the tongue portion 22 is same as that of the standard USB plug within an allowable tolerance. That is, length, width and height of the tongue portion 22 are substantially equal to those of the standard USB plug. An arrangement of the set of first contacts 3 is compatible to that of the standard USB receptacle as described above.

A printed circuit board (PCB) 7 is used for facilitating terminating. The PCB 7 has a rectangular-shaped substrate 70 with a top and a bottom surfaces. A set of first conductive pads 71 and a set of second conductive pads 72 are arranged in the front and rear sections of the top surface of the substrate 70. Additionally, a group of first conductive traces 73 and a group of second conductive traces 74 are arranged in the front and rear sections of the bottom surface of the substrate 70. The PCB 7 is sandwiched between the pair of arm portions 215, with lateral edges thereof received in the grooves 2152 of the arm portions 215. The tail portions 36 of the first contacts 3 are disposed on the first conductive traces 73 and soldered thereon, while the tail portions 46 of the second contacts 4 are disposed on the first conductive pads 71 and solder thereon, too.

The cable 10 comprises four first wires 101 arranged in a lower row and a pair of second wires 102 arranged in an upper row. Each first wire 101 comprises an inner conductor 1011 soldered to the second conductive traces 74 of the PCB 7 and an outer jacket 1012 enclosing the inner conductor 1011. Each second wires 102 comprises a pair of differential pairs 1021 and each differential pair includes two wire members having the same structure as that of the first wire 101, a grounding conductor 1023, and an outer jacket 1022 enclosing the differential pair 1021 and the grounding conductor 1023. Each of the differential pairs 1021 are respectively soldered to the corresponding second conductive pads 72 of the PCB 7, while the two grounding conductors 1023 are together soldered to the conductive pad 72 located in a middle of the conductive pads 72. The cable 10 further includes a group of optical fiber 103 respectively extend into the passages 232 of the insulated housing 2 and coupled to the lenses 5.

The cable assembly 1 further comprises a metal shell 12 and an insulative cover 13.

The metal shell 12 comprises a lower first part 121 and an upper second part 122 engaging with the first half 121. The first part 121 comprises a front tube-shape mating frame 1211 and a rear U-shaped body section 1212, and the second part 122 comprises an inverted U-shaped body section 1221 and a cable holder member 1222 attached to a top side of the body section 1221. The first part 121 and the second part 122 are assembled to the insulated housing 2, with the tongue portion 22 accommodated in the mating frame 1211, the base portion 21 received in the body sections 1212, 1221 which are engaged with one another, and the cable holder member 1222 crimped to the cable 10.

The insulative cover 13 is partially molded over the metal shell 12 and the cable 10 nearby the connector 11.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the tongue portion is extended in its length or is arranged on a reverse side thereof opposite to the supporting side with other contacts but still holding the contacts with an arrangement indicated by the broad general meaning of the terms in which the appended claims are expressed.

I claim:

1. A cable assembly, comprising:
an insulative housing having a base portion and a tongue portion, said tongue portion defining a number of cavities recessed inwardly from one of an upper or a bottom surfaces of the tongue portion;
a number of lenses retained in the cavities and connected to corresponding optical fiber; and
a plurality of contacts mounted to the insulated housing, each of the contacts having a mating portion disposed about the other surface of the tongue portion and a tail portion rearward extending beyond the base portion for electrically connecting with a corresponding wire.

2. The cable assembly as claimed in claim 1, wherein a retaining member is assembled to the tongue portion to fix the lenses.

3. The cable assembly as claimed in claim 2, wherein the retaining member includes a main portion and a number of retention portions formed with the main portion, wherein the main portion is disposed on the surface of the tongue portion to prevent the lenses sliding out of the cavities and the retention portions are inserted into the tongue portion to retain the retaining member with the tongue portion together.

4. The cable assembly as claimed in claim 3, wherein a number of spring fingers are formed at a rear edge of the main portion, wherein rear edges of the lenses rely against front surfaces of the spring members.

5. The cable assembly as claimed in claim 4, wherein the spring fingers are separated into a number of groups, and each group has two juxtaposed spring fingers disposed adjacent to the rear edge of the corresponding lens.

6. The cable assembly as claimed in claim 5, wherein a passage is formed between each group of spring fingers to allow the corresponding optical fiber passing through.

7. The cable assembly as claimed in claim 4, wherein the spring fingers are inserted into holes of the tongue portion.

8. The cable assembly as claimed in claim 1, wherein a blocking board is disposed in front of the cavities and integrated with the tongue portion, wherein a number of front outlets are defined in the blocking board and communicated with the cavities.

9. The cable assembly as claimed in claim 8, wherein a number of tube-shaped protective member are mounted to the front outlets, wherein header portions of the lenses are accommodated in the protective members.

10. A cable assembly, comprising:
an insulative housing having a base portion and a tongue portion, said tongue portion defining a number of cavities recessed inwardly from one of an upper or a bottom surfaces of the tongue portion;
a number of lenses retained in the cavities and connected to corresponding optical fiber;
a plurality of contacts supported by the insulated housing and electrically connected to wires, said contacts separated into a set of first contacts used for transmitting a first kind of signals, and a set of second contacts which comprises two pairs of differential contacts respectively for transmitting a second kind of signals and a grounding contact disposed between the two pair of differential contacts.

11. The cable assembly as claimed in claim 10, wherein both the first contacts and the second contacts respectively includes mating portions disposed above the other surface of the tongue portion and arranged along a front-to-back direction, and tail portions rearward extending beyond the base portion.

12. The cable assembly as claimed in claim 11, wherein two arm portions extending rearward from lateral sides of a back surface of the base portion, and each arm portion has a groove defined in an inner side thereof.

13. The cable assembly as claimed in claim 12, wherein a printed circuit board is sandwiched between the two arm portions, with lateral edges thereof received in the grooves of the two arm portions.

14. The cable assembly as claimed in claim 13, wherein tail portions of the first contacts and the second contacts respectively disposed on opposite surfaces of the printed circuit board and soldered thereon.

15. The cable assembly as claimed in claim 14, wherein the wires are soldered to the printed circuit board.

16. The cable assembly as claimed in claim 11, wherein the first contacts have retention portions interconnected with the mating portions and tail portions, and the retention portions are insert molded with the housing.

17. The cable assembly as claimed in claim 11, wherein the second contacts have retention portions interconnected with the mating portions and tail portions, and the retention portions are insert molded with an insulator, wherein the insulator is inserted into a hollow portion recessed forwardly from a back surface of the base portion.

18. The cable assembly as claimed in claim 10, wherein a conductive shell encloses the insulative housing and a cover partially encloses the conductive shell.

19. An electrical/optical connector assembly comprising:
an insulative housing defining a mating tongue with thereon opposite first and second faces in a vertical direction perpendicular to a main plane of said mating tongue;
a metallic shell enclosing said housing and defining a mating port in which said mating tongue extends;
a plurality of first electrical contacts defining a plurality of first mating sections disposed on the first face in a juxtaposed manner along a transverse direction perpendicular to the vertical direction;
a plurality of second electrical contacts defining a plurality of second mating sections disposed on the first face in another juxtaposed manner along said transverse direction and in an forwardly offset manner with regard to the first mating sections in a front-to-back direction perpendicular to both said vertical direction and said front-to-back direction;
a plurality of optical contacts each equipped with a lens at a front end thereof under a condition that said second face defines a plurality of receiving cavities accessible from an exterior in the vertical directing during assembling so as to allow the lens of the corresponding optical contact to be loaded thereinto in the vertical direction;
a plurality of optical fibers each connected to the corresponding lens under a condition that the lens and the second mating sections are located at substantially a same position in the front-to-back direction while vertically offset from each other, while the corresponding optical fibers and rear portions of the second contacts behind the second mating sections are located at substantially another same position in said front-to-back direction while essentially at a same level.

20. The connector assembly as claimed in claim 19, wherein said lens the second mating sections are overlapped with one another in the vertical direction while said optical fibers and the corresponding rear portions f the second contacts are not.

* * * * *